Aug. 30, 1955 P. S. WILLIAMS 2,716,730
APPARATUS FOR MAGNETIC WELL LOGGING
Filed July 24, 1952 4 Sheets-Sheet 1

Philip S. Williams Inventor
By W. O. Heilman Attorney

Aug. 30, 1955  P. S. WILLIAMS  2,716,730
APPARATUS FOR MAGNETIC WELL LOGGING
Filed July 24, 1952  4 Sheets-Sheet 3

Philip S. Williams Inventor
By W. O. Heilman Attorney

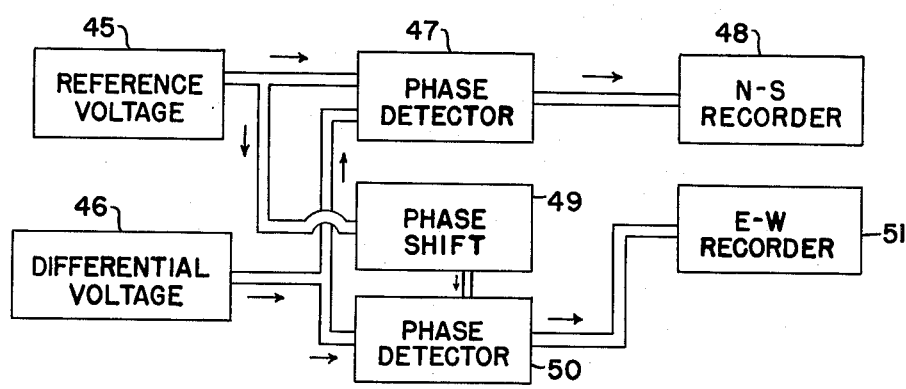
FIG.-5
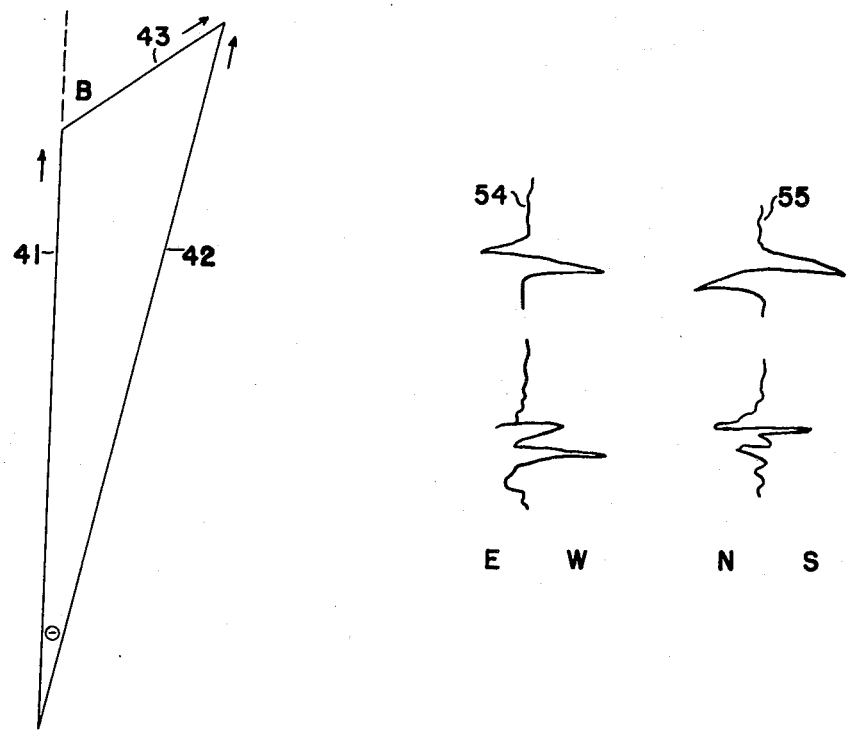
FIG.-4
FIG.-6

United States Patent Office 2,716,730
Patented Aug. 30, 1955

2,716,730

APPARATUS FOR MAGNETIC WELL LOGGING

Philip S. Williams, Tulsa, Okla., assignor to Esso Research and Engineering Company, a corporation of Delaware Application July 24, 1952, Serial No. 300,580

7 Claims. (Cl. 324—8)

This invention relates to improvements in the art of logging well bores to ascertain the probable nature of the various subsurface strata penetrated by the well bore. More particularly it concerns a novel method and apparatus for logging a well bore magnetically by determining variations in both the intensity and direction of vertical gradients in the magnetic field existing along the borehole.

This application is a continuation-in-part of application Serial No. 123,753, filed October 26, 1949, which is now abandoned.

In drilling oil wells for the purpose of locating petroleum deposits, it is the general practice to employ one or more of a variety of testing procedures to obtain information as to the nature of the earth adjacent the well bore. These procedures are called well logging methods, and generally require the continuous indication of chemical or physical properties along the vertical length of the well bore. In view of the fact that such methods can provide a great deal of desirable information as to the nature of the earth, and as to the probability of encountering petroleum, a great deal of effort has been devoted to developing and improving methods of well logging.

It has been appreciated that one manner of logging a well is to determine the variation in magnetic properties of the earth adjacent the bore hole. Many methods and apparatus have been developed to accomplish this. For example, apparatus may be used to determine the variation in magnetic flux along the well bore; or, in other words, the magnetic field existing in the bore is directly measured. Such a method is subject to the disadvantage, among others, that the strength of the magnetic field in the earth varies with time, so that absolute measurements of magnetic intensity are limited in significance. To overcome deficiencies of this type of well logging, it has also been proposed to set up artificial magnetic fields of controlled strength to permit the more accurate measurement of the magnetic properties of the various earth layers. The latter method is particularly characterized by the necessity of rather cumbersome and expensive equipment.

It is the principal object of this invention to provide new and improved methods and apparatus for magnetic well logging that are not subject to certain disadvantages of the conventional types of magnetic well logging, such as those indicated.

In accordance with the present invention an improved method and apparatus are provided for logging a bore hole and measuring the vertical gradient of the horizontal magnetic intensity both as to magnitude and as to direction relative to magnetic north. As used here the term "vertical" means substantially parallel to the axis of the bore hole, which normally would be within a few degrees of a true vertical. The term "horizontal" as used here would then mean a direction perpendicular to vertical as herein defined.

The horizontal magnetic intensity at any point in the earth depends primarily upon the horizontal component of the magnetic field. As is generally appreciated, with the exception of the localities directly at the magnetic poles, the earth's magnetic field is directed downwardly with respect to the horizon in a manner providing a substantial horizontal component, depending in part upon the particular latitude. The magnetic characteristics of the earth in any given locality act to modify the earth's magnetic field. For example, a body of magnetic material will set up a magnetic field which will act in conjunction with the earth's magnetic field to provide a characteristic local magnetic field. Again, variations in the earth's magnetic field at particular localities will depend upon the susceptibility of the material present. A particularly significant factor is that many formations in the earth deposited at a particular geological time have residual magnetization different in direction from what is now the magnetic north. Because of these factors, in moving in a generally vertical direction downwardly through the earth, variations in the horizontal component of magnetic intensity will be encountered. The variations will be both in magnitude and in direction.

In this connection the horizontal component of the earth's field may reasonably be assumed to change but slowly, if at all, with distance up and down the bore hole. Thus variations in the horizontal intensity may be in magnitude only, if the formations are isotropic in susceptibility for various directions about the vertical axis, or may include or consist only of changes in direction if anisotropy exists in some strata. The horizontal intensity in the bore hole can also be affected by residual magnetization of the formations around it. Such remanent magnetization is known to exist in some earth materials and may have almost any direction. In some cases this direction of magnetization is believed to be controlled or affected by the direction of magnetic north at the time when the beds were deposited. In any event this factor will change from bed to bed in moving vertically along the bore hole. One use of such variations in direction of remanent magnetization is to provide "time markers" in otherwise homogeneous beds, since it is accepted that the direction of magnetic north has varied widely with time in the past.

From the above it is apparent that measurements of the vertical variations (in both magnitude and direction) of the horizontal intensity in a bore hole will yield information of value. This information is particularly useful in making correlations between one hole and another, although data concerning the nature of the beds traversed should also emerge.

Since the magnetic effects mentioned are rather small, and since the boundaries between strata in the subsurface are commonly fairly sharp (i. e. the boundary or transition zones occupy little space vertically) a gradient method of measurement is distinctly superior to any attempt to measure the magnetic field in the hole directly. For one thing, earth field variations with time substantially cancel out. The horizontal component of the magnetic intensity is best for measurement in that it can be shown that it will indicate boundaries between beds more sharply than a vertical intensity method. If in addition to the magnitude of the horizontal intensity variation the direction is also measured, an additional parameter related to anisotropy, dip, remanent magnetization, or some combination of these, is available for study.

In accordance with the present invention a borehole is logged magnetically with an apparatus that comprises means for developing a signal dependent on the difference in intensity and direction of the horizontal components of the natural magnetic fields existing at at least two vertically spaced points in the borehole, means for simultaneously developing a signal dependent on the horizontal component of the earth's magnetic field at an adjacent level, and means for comparing these signals. More particularly, the apparatus is provided with means for developing an alternating current electrical signal whose magnitude is proportional to the intensity of, and whose phase is dependent on the direction of, the horizontal component of the magnetic field at a selected point in the borehole and with means for developing simultaneously, at a second point in the borehole spaced vertically from the first point, an alternating current electrical signal of the same frequency as the first signal but dependent in magnitude and phase on the intensity and direction of the horizontal component of the natural magnetic field at the second point in the borehole. Means are provided for combining these signals in opposition so as to obtain a signal constituting the difference between the first and second signals. Means are also provided for comparing the phase of this difference signal with the phase of an alternating current electrical signal, of the same frequency as the signals referred to, whose phase is dependent on the direction of the horizontal component of the natural magnetic field at any point in the borehole adjacent the apparatus, i. e., of the earth's magnetic field, so as to determine the direction of the vector represented by the difference signal with respect to magnetic north.

In one form of apparatus that may be used for conducting the well logging method of this invention, three air-core coils are employed. These three coils are carried by a rotatable framework which may be lowered into a well bore. Each of the three coils is positioned so that the axis of the coil is perpendicular to the axis of the framework about which the coils are rotated. The coils are positioned in the framework in vertical displacement along the axis of the framework. It is essential that two of the coils in this arrangement be of substantially identical electrical characteristics, and that these coils be positioned so that their axes are parallel. By connecting the top and bottom of these coils in series opposition or parallel opposition, the voltages developed in each coil when the framework is rotated in a uniform magnetic field will be equal and opposite, so that no net voltage will be developed in the circuit.

It is to be understood that by parallel opposition connection of the two coils is meant a connection wherein the end of each coil is connected to the opposite end of the other coil, or in other words, that the coil terminals that are connected together will be of opposite polarity at any given instant during rotation in a magnetic field. The voltage that is measured is that existing between the two points at which the coils are connected to each other.

As already stated, when the coils are rotated in a uniform magnetic field, no net voltage will be developed in the circuit. However, when these coils are rotated in a non-uniform magnetic field, the voltages developed by the two coils will no longer be equal and opposite, but some differential signal will result which will be determined by the extent of non-uniformity of the magnetic field, or by the gradient of the magnetic field as measured at the two points of the field in which the coils are located. By revolving the third coil at the same speed as the magnetic gradient measuring coils, and by determining the phase relationships of the voltages developed by the three coils, it is possible to determine the direction of the differential voltage vector with respect to magnetic north.

In order that the nature of this invention may be more clearly understood, a suitable embodiment will be described with reference to the accompanying drawings in which:

Figure 1 illustrates in cross-sectional elevation one form of well logging apparatus, in position in the well bore;

Figure 2 diagrammatically shows suitable components which may be used at the surface of the earth to plot a continuous record of electrical signals indicative of the extent and direction of horizontal magnetic variations in the bore hole;

Figure 4 is a vector diagram of the outputs of the two coils contributing to the differential voltage;

Figure 5 is a block diagram of one recording arrangement that can be employed for resolving the differential voltage into right angle components; and Figure 6 is a representation of a portion of the record obtained with the arrangement of Figure 5.

Figure 1:
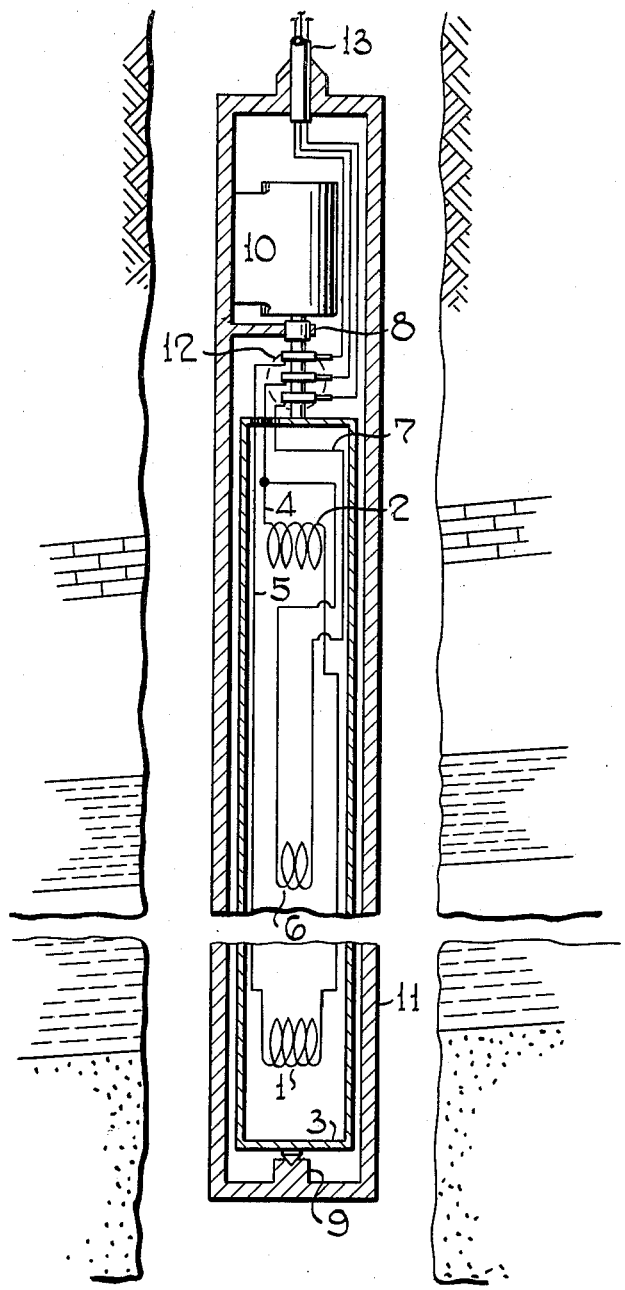

Referring now to Figure 1, the numeral 11 indicates a suitable housing for the necessary down-the-hole portion of the apparatus. Housing 11 containing the apparatus may be lowered into the bore hole by means of the supporting cable 13. Contained within the housing 11 is a rotatable framework 3, supported by suitable bearings 8 and 9, and coupled to a motor or driving means 10, adapted to rotate the framework 3 about the vertical axis passing through the bearings 8 and 9. As will be brought out, it is desirable that the driving means 10 rotate the framework at a high uniform rate of rotation, so that it is convenient to use an electric motor for the driving means 10. Alternatively, if desired, a spring motor or other means for turning framework 3 may be employed.

Three coils, 1, 2 and 6, are rigidly fixed to the framework 3, so that the axes of these coils are perpendicular to the axis of rotation of the framework 3. Further, it is essential that the axes of the top and bottom coils be parallel to each other, and that these two coils have substantially identical electrical characteristics. Towards this end, coils 1 and 2 are wound in as nearly an identical fashion as possible, comprising the same number of coil turns, and having the same electrical inductance. It is not necessary that coil 6 have the same electrical characteristics as coils 1 and 2, nor, as indicated, is it necessary that the axis of coil 6 be parallel to the axis of the other two coils. The manner in which the coils are fixed to the framework 3 is not critical, but should be accomplished so as to fix the coils rigidly without possibility of movement. The positioning of the third coil 6 between the other two coils is a constructional convenience only. Actually it may be any place in the rotating framework, or even in a nearby framework rotating in synchronism with the main framework. The reason is that the earth's field is roughly parallel to itself over considerable distances.

The top and bottom coils may be connected in series opposition as illustrated or these coils may be connected in parallel opposition. Consequently, when framework 3 is rotated, each of the three coils is caused to cut the horizontal components of the lines of magnetic force in which the coils are turned. At a given speed of rotation, consequently, each of the coils will develop a voltage proportional to the intensity of the magnetic field adjacent that coil. However, due to the manner of connecting coils 1 and 2, the voltage developed across these two coils as detected across leads 4 and 5, will represent a differential voltage proportional to any difference in the magnetic intensity between the two coils. Similarly, if no difference in magnetic intensity exists, the voltages developed by coils 1 and 2 will be exactly equal in magnitude so that no differential voltage will be developed across leads 4 and 5. For the purpose of clarity, the voltage developed by series-opposed coils 1 and 2, as detected across leads 4 and 5, will be referred to simply as the "differential voltage."

Figure 2:
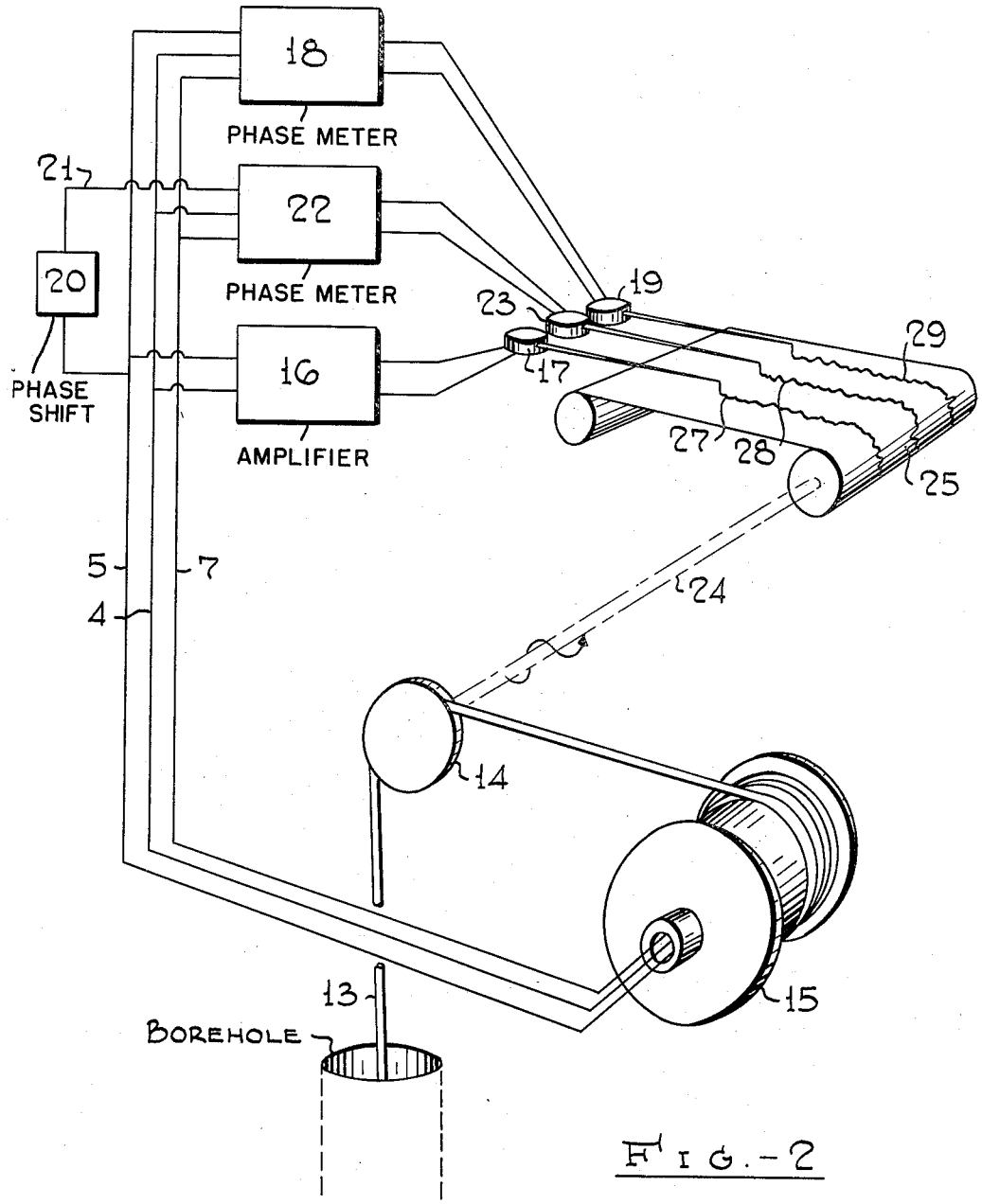

The function of the remaining coil 6 which may be said to be a "phasing direction indicator" will be brought out in connection with Figure 2. For the present it is sufficient to note that the voltage developed by coil 6 will appear across leads 4 and 7, as it is convenient to connect one side of coil 6 to conductor 4 leading to coil 2. The voltage developed by coil 6 as measured across leads 4 and 7, will be referred to as the "phasing voltage." The voltages developed across coils 1 and 2, and across coil 6, may be conducted to the surface of the earth by means of the slip ring assembly 12, and the three conductors carried through the supporting cable 13.

It is important that the apparatus, as described, be non-magnetic in character, and be so designed that eddy currents are not generated by rotation of the parts. Thus the apparatus may consist of copper, or brass construction, with suitable provision for shielding between the driving means 10, and the coils, in the event an electrical current is utilized as the driving means. As a further refinement of the apparatus heretofore described, centering springs of conventional construction may be used to maintain the apparatus in the center of the borehole and in alignment with the borehole. Again, if desired, pre-amplifiers may be maintained in the down-the-hole portion of the apparatus to amplify the differential voltage and phasing voltage developed by the coils prior to transmission to the earth's surface.

In order to understand the operation of the apparatus described, it may be stated that on rotation of the framework 3, alternating current voltages are developed in each of the coils which may be represented as vectors. Thus in considering coils 1 and 2, since these coils are connected in opposition, the voltage vector developed by them will be determined by the vector difference between the voltage components provided by each of the coils. The phase angle of the vector difference may be referred to an arbitrary reference point which may be said to be the zero rotation angle of the framework. Since the magnetic field perpendicular to the axis of the apparatus will vary only slightly over the length of the apparatus, the phase angle between this difference vector and the magnetic north vector may be determined by measuring the phase angle between the differential voltage of leads 4 and 5, and the phasing voltage of leads 4 and 7. In order to accomplish this, a conventional phase meter may be used to determine the phase relationship between these voltages. However, while a phase meter used in this manner would indicate the magnitude of the phase difference, it would not indicate the sense of the phase difference. To accomplish this it is possible to subject the differential voltage to an arbitrary phase shift to produce another voltage whose phase may then be compared with that of the phasing voltage. Consequently, the phase relationships determined between the differential voltage of leads 4 and 5, the phasing voltage of leads 4 and 7, and the phase-shifted differential voltage of leads 4 and 5, will specifically fix the phase of the differential voltage relative to the phasing voltage within the range of −180° to +180°.

Figure 2 illustrates a suitable manner of accomplishing this object and will now be described. Cable 13, supporting the apparatus of Figure 1 in the borehole, may be wound on a conventional drum 15 having provision for transmission of the voltages developed by leads 4, 5 and 7, away from the drum. A slip ring assembly or other suitable arrangement may be used for this purpose so that three conductors extending from the drum 15 may carry the signals developed by the coils in the borehole. For simplicity, these conductors extending from drum 15 are identified by numbers 4, 5 and 7, corresponding to the leads of Figure 1 to which they are connected. In order to measure the differential voltage developed by coils 1 and 2, leads 4 and 5 are conducted to a suitable electronic assembly 16, adapted to amplify the differential voltage in a manner to permit utilization of this voltage to control the pen 17 of the recording apparatus 25. The paper of the recording apparatus 25 is preferably driven by a shaft or coupling 24 controlled by a measuring wheel 14 over which the cable 13 may be moved. In this manner the movement of the paper on the recorder 25 may be made proportional to the depth of the logging apparatus in the borehole. Consequently, pen 17 will produce a record on the recording paper showing the variations of the differential voltage produced by coils 1 and 2, as related to the depth of these coils in the borehole.

The phasing voltage developed by leads 4 and 7 and the differential voltage of leads 4 and 5 are transmitted to the phase measuring instrument 18 so as to provide a signal operative to control the movements of pen 19, so as to indicate the phase relationship between the voltage across leads 4 and 5, and the voltage across leads 4 and 7.

The voltage indicated between leads 4 and 5 is also passed through a phase shifting means 20 to produce a voltage corresponding in magnitude to the voltage of leads 4 and 5 but differing by a particular phase relation. Thus by connecting lead 5 to the phase shifting means 20, the phase shifted voltage will be that existing between lead 4 and lead 21. Phase shifting means 20 may consist of any desired type of phase shifting device or circuit to change the phase of the differential voltage by a given amount; for example, so as to lag by 90°. Phase measuring instrument 22 may then be used to control pen 23 so as to indicate the phase relationship of the phase shifted differential voltage of leads 4 and 5 and the phasing voltage of leads 4 and 7.

Consequently, recording apparatus 25 will record a trace 27 responsive to movements of pen 17 to indicate the differential voltage of leads 4 and 5 or in other words to indicate variations in the intensity of horizontal magnetic gradients along the borehole. Trace 29 will record the phase angle between the differential voltages of leads 4 and 5 and the phasing voltage of leads 4 and 7 without, however, distinguishing whether the phase angle is a "lead" or a "lag" angle. However a comparison of the phase-shifted trace 28 drawn by pen 23 and trace 29 will fix the phase of the differential voltage relative to the phasing voltage within the range of −180° to +180° and thus indicate the direction of the differential voltage vector relative to magnetic north.

It will be apparent that several alternative methods may be used for ascertaining the phase relationship between the differential voltage and the phasing voltage. For example, if desired, a "trigger tube phase meter circuit" may be employed. A suitable form of this circuit has been developed by Florman and Tait of the National Bureau of Standards and is fully described in Electronics, June 1949, page 162. This circuit eliminates the necessity for the phase shifting means 20 and the phase meter 22, as the circuit permits recording of substantially 360° phase angle relations on a single trace.

Figure 3:
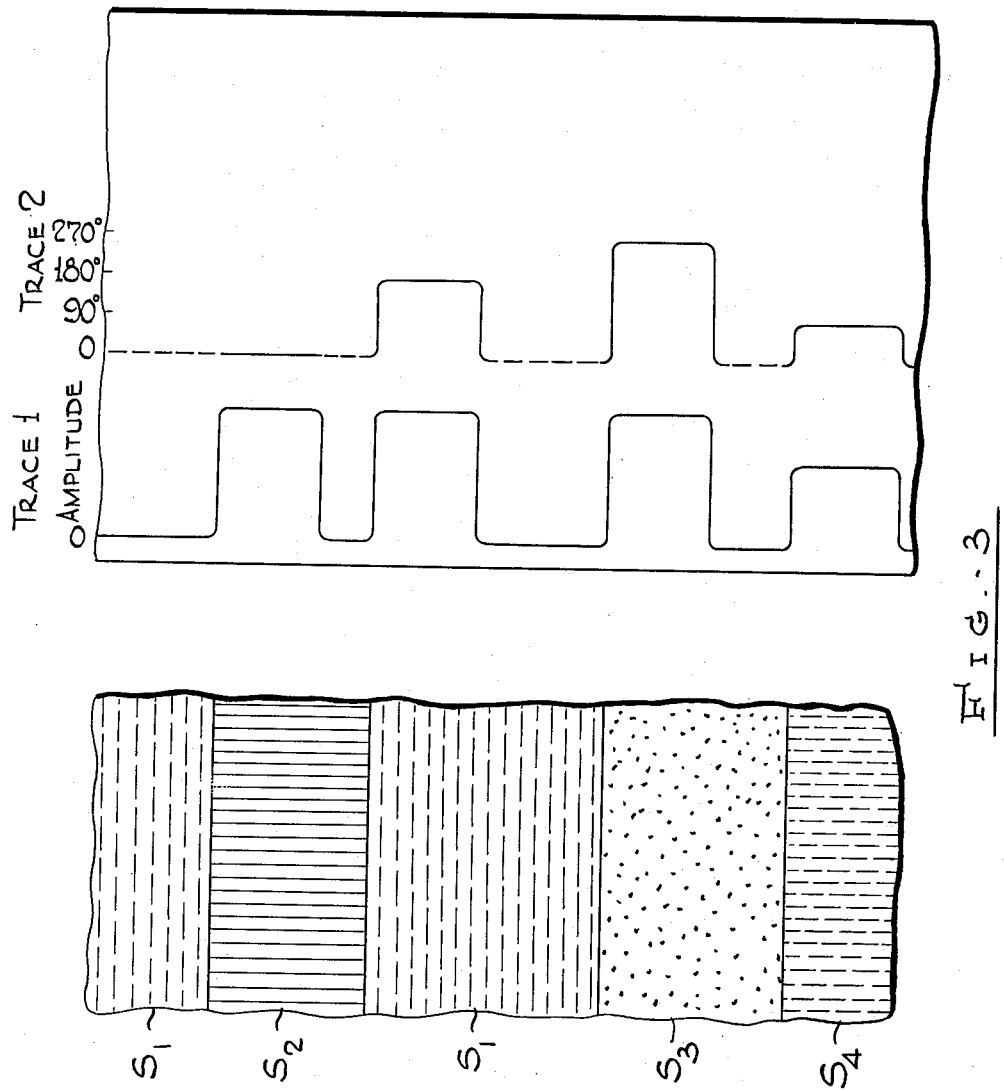
Figure 3 illustrates a typical record produced by one embodiment of this invention.

Figure 3 diagrammatically illustrates the nature of the record prepared by the apparatus described. For simplicity, the record illustrated is of the nature prepared by a trigger tube phase meter circuit so that a single trace represents the phase relations from 0° to 360°. Thus trace 2 of Figure 3 represents the phase relation between the differential voltage and the phasing voltage while trace 1 represents the variation in magnitude of the differenial voltage. It will be understood that if the circuit arrangement of Figure 2 is used, an additional trace will be drawn where trace 2 will show a range of 0° to 180° for example, and the additional trace will similarly show a range of 0° to 180° so as to uniquely fix the phase relation between the differential voltage and the phasing voltage.

For further simplicity in describing the nature of the record and the manner in which it is interpreted, five representative subsurface strata are illustrated in Figure 3, placed alongside of the traces which may be produced from such strata. Of the strata illustrated, some differ in the magnitude of the horizontal component of the magnetic field and some differ in the direction of the horizontal component. Since, in the example given, stratum $S_2$ has a greater horizontal component than stratum $S_1$, the amplitude trace will show a voltage difference as soon as the lower coil 1 reaches stratum $S_2$. As soon as both main coils 1 and 2 are alongside stratum $S_2$, the amplitude trace will return to zero and will again shift as the second stratum $S_1$ is encountered. Although second stratum $S_1$ and stratum $S_3$ have the same magnitude of magnetic field horizontal component, the amplitude trace will shift when the interface is traversed because of the difference in the direction of the component in the two strata. Similarly, $S_3$ and $S_4$ have the same magnitude of horizontal field component, but differ less in direction than do $S_1$ and $S_3$.

In general, it may be stated that when there is no angular difference in the direction of the horizontal component between two adjoining strata, the indicated phase angle on trace 2 will be either zero or 180°, depending on whether the lower or upper stratum has the greater field magnitude. When there is no magnitude difference between the two strata but there is a difference in the direction of the horizontal component, trace 2 will show either 90° or 270° phase difference. Where there is a difference both in magnitude and direction of the magnetic components the phase angle indicated by trace 2 will be of some odd value other than 90°, 180°, 270°, or 360°. Actual determination of the direction of the horizontal components in the various strata involves trigonometric calculations of the data recorded on the traces.

It will be appreciated that when employing a three-trace recording system of the type shown in Figure 2 rather than the two-trace system just described, some mathematical manipulation is required in comparing traces 28 and 29 to determine whether the phase difference between these traces is indicative of a "lead" or a "lag" angle. As a specific example, assume that phase shift device 20 gives a 90° lag as indicated. Suppose that on a given portion of the graph, trace 29 shows a phase angle of 45°. It remains to determine whether this is $+45°$ or $-45°$. Suppose that trace 28 on the same portion of the chart also shows a phase angle of 45°. Taking into account the 90° phase lag it follows that the phase angle indicated by trace 29 is $+45°$ (subtracting 90° from $+45°$ gives $-45°$). If, on the other hand, trace 28 shows a reading of 135° at the same time that trace 29 shows a reading of 45° then the reading on trace 29 must be $-45°$ (subtracting 90° from $-45°$ gives $-135°$). Once the proper sign of the indicated phase angle has been ascertained the interpretation of trace 29 with regard to trace 27 would be made in a manner similar to that described for trace 1 with regard to trace 2 in the discussion of Fig. 3.

Still another method for recording the voltages induced in the coils of the magnetic logger of this invention is to resolve the differential voltage into two components, one parallel to magnetic north and the other perpendicular to magnetic north. This method has a number of advantages as will be brought out. Referring to Figure 4, the output from one of the coils can be represented by vector 41 and the output from the other coil by vector 42. Their vector difference will then be vector 43. Expressed mathematically, vector 41 can be represented as $E_1 \cos(wt)$, vector 42 as $E_2 \cos(wt+\theta)$ and vector 43 as $e \cos(wt+\beta)$.

$E_1$ is the voltage induced in either coil,
$E_2$ is the voltage induced in the other coil,
$e$ is the difference voltage,
$\theta$ is the angular difference between vectors 41 and 42,
$w$ is the frequency of rotation of the coils in radians per second,
$t$ is time in seconds, and
$\beta$ is the angular difference between vector 43 and magnetic north.

The vector difference i. e. vector 43 can be represented as $e \cos(wt+\beta) = e \cos(wt) \cos\beta - e \sin(wt) \sin\beta$.

The separation of the differential voltage into components can be accomplished by any of several types of phase detectors, such as those described in "Electronic Instruments" by Greenwood, Holdam and MacRae, pages 384 and 385 (McGraw-Hill, 1948) or in the Radio Engineer's Handbook, by Terman, page 585 (McGraw-Hill, 1943).

In Figure 5 is shown a block diagram of one circuit arrangement that can be used to resolve the differential voltage into north-south and east-west components.

Reference voltage 45, whose phase is dependent on the direction of magnetic north, is used to control phase sensitive detector 47 to which differential voltage 46 is applied. The component of differential voltage 46 that is in phase with reference voltage 45 will appear in and be recorded by recorder 48. Reference voltage 45 is at the same time subjected to a 90° phase shift by phase shifting means 49 and the phase shifted voltage is used to control phase sensitive detector 50, to which differential voltage 46 is also applied. The component of differential voltage 46 that is 90° out of phase with reference voltage 45 will thus appear in and be recorded by recorder 51. Thus recorders 48 and 51 can be employed to make side-by-side traces of the north-south and east-west components of the differential voltage.

In Figure 6 are shown reproduced portions of actual traces obtained when making a magnetic log of a well by the method of this invention, using a recording arrangement of the type shown in Figure 5. Trace 54 is a record of the east-west components and trace 55 is a record of the north-south components. By measuring the amplitudes and directions of the kicks it is possible to calculate the vector values.

Since the east-west components result from remanent magnetism only, this trace is of value in gleaning information from the log as to the remanent magnetism in the various earth layers.

Another advantage of observing or recording the two components of the difference voltage separately is that the relatively constant error voltage due to any coil mismatch (in amplitude and phase) appear as additive terms in the component voltages. Then, being relatively constant, these terms can be filtered out or allowed for.

It is to be understood that the apparatus for the magnetic logging of wells in accordance with this invention may take many forms and that many modifications of the apparatus described are possible without departing from the spirit and scope of the invention. For example the third coil 6 may be dispensed with and the reference voltage taken from either of the coils 1 or 2. The reason for this is that, as previously brought out, the horizontal magnetic field at any point in the borehole is very closely parallel to the horizontal component of the earth's magnetic field. Thus, in the discussion presented above, vectors 41 and 42 are roughly equal in magnitude and direction and either could be taken as the vector representing the earth's magnetic field. It should be appreciated that vector 43 is much smaller in magnitude than vectors 41 and 42 than would be deduced from Figure 4, the proportions used there being selected merely for convenience and clarity of illustration.

What is claimed is:

1. Apparatus for magnetically logging a borehole comprising means for developing a signal dependent on the difference in intensity and direction of the horizontal components of the natural magnetic fields existing at at least two vertically spaced points in the borehole, means for simultaneously developing a signal dependent on the horizontal component of the earth's magnetic field at an adjacent level, and means for comparing the said signals.

2. Apparatus for magnetically logging a borehole comprising means for developing a first alternating current electrical signal proportional in magnitude to the difference in intensity of the horizontal components of the natural magnetic fields existing at two vertically spaced points in the borehole, and whose phase is dependent on the difference in direction of said horizontal components, means for simultaneously developing a second alternating current electrical signal, of the same frequency as said first electrical signal, whose phase is dependent on the direction of the horizontal component of the natural magnetic field adjacent said spaced points, means for measuring the magnitude of said first signal and means for measuring the phase relation between said first signal and said second signal.

3. Apparatus for magnetically logging a borehole comprising means for developing a first alternating current electrical potential whose magnitude is proportional to the intensity of the horizontal component of the natural magnetic field existing at a selected point in the borehole, and whose phase is determined by the direction of said horizontal component, means for simultaneously developing a second alternating current electrical potential, of the same frequency as said first potential, whose magnitude is proportional to the intensity of, and whose phase is determined by the direction of, the horizontal component of the natural magnetic field existing at a second selected point in the borehole spaced vertically from said first selected point, means for combining said potentials in opposition, whereby a difference signal is obtained whose magnitude is dependent upon the difference in intensity of said horizontal components and whose phase is dependent on the difference in direction of said horizontal components, means for developing an alternating current electrical reference signal, of the same frequency as said difference signal whose phase is dependent on the horizontal component of the natural magnetic field existing in the borehole adjacent said vertically spaced points, and means for comparing the phase relation of said difference signal and said reference signal.

4. Apparatus according to claim 3 including means for resolving said difference signal into at least two components, one component being in phase with the north-south portion of said reference signal and the other component being 90° out of phase with said north-south portion.

5. Apparatus according to claim 3 including a first phase sensitive detector means for applying said reference signal and said difference signal to said phase sensitive detector, means for shifting a signal through a 90° phase angle, means for applying said reference signal to said phase shifting means, whereby a phase shifted reference signal is obtained, a second phase sensitive detector, means for applying said difference signal and said phase shifted reference signal to said second phase sensitive detector, and recording means driven by each of said phase sensitive detectors, whereby separate records of the north-south and east-west components of said difference signal are obtained.

6. Apparatus for magnetically logging a borehole which comprises a supporting member rotatable about a longitudinal axis, means for rotating said supporting member, a pair of coils of substantially identical electrical characteristics spaced vertically from each other and fixed to said supporting member with their axes parallel to each other and normal to said longitudinal axis, means connecting said coils in electrical opposition, a third coil fixed to said supporting member with its axis normal to said longitudinal axis, voltage determining means in an electrical circuit with said means connecting said pairs of coils in opposition and phase determining means in an electrical circuit with said third coil and with said means connecting said pair of coils in opposition.

7. Apparatus for magnetically logging a borehole which comprises a supporting member rotatable about a longitudinal axis, means for rotating said supporting member, a pair of coils of substantially identical electrical characteristics spaced vertically from each other and fixed to said supporting member with their axes parallel to each other and normal to said longitudinal axis, means connecting said coils in electrical opposition, a third coil fixed to said supporting member, with its axis normal to said longitudinal axis, voltage determining means in an electrical circuit with said means connecting said pair of coils in opposition, phase determining means in an electrical circuit with said third coil and with said means connecting said pair of coils in opposition, means for shifting the phase in a circuit including said pair of coils, and a second phase determining means in a circuit including said phase shifting means and said third coil.

References Cited in the file of this patent

UNITED STATES PATENTS

| | | |
|---|---|---|
| 2,359,894 | Brown et al. | Oct. 10, 1944 |
| 2,436,039 | Fay | Feb. 17, 1948 |
| 2,519,094 | Zuschlag | Aug. 15, 1950 |

FOREIGN PATENTS

| | | |
|---|---|---|
| 27,440 | India | Jan. 4, 1948 |